United States Patent
Ohashi

(10) Patent No.: US 7,851,076 B2
(45) Date of Patent: *Dec. 14, 2010

(54) METHOD OF FABRICATING SILICON SUBSTRATE FOR MAGNETIC RECORDING MEDIA, AND MAGNETIC RECORDING MEDIUM

(75) Inventor: Ken Ohashi, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 12/211,379

(22) Filed: Sep. 16, 2008

(65) Prior Publication Data

US 2009/0098415 A1    Apr. 16, 2009

(30) Foreign Application Priority Data

Oct. 10, 2007    (JP)    .............................. 2007-264397

(51) Int. Cl.
G11B 5/71    (2006.01)
G11B 5/82    (2006.01)
H01L 21/20    (2006.01)

(52) U.S. Cl. ................. 428/846.1; 428/848.8; 360/135; 257/377; 438/487

(58) Field of Classification Search ................. 428/141, 428/64.4, 846.2, 846.3, 846.1, 848.8, 446; 360/135, 136; 438/166, 151, 429, 396, 435, 438/774, 487; 257/377, 530, 288; 216/59

See application file for complete search history.

(56) References Cited

U.S. PATENT DOCUMENTS 3,998,673 A * 12/1976 Chow .......................... 438/429
4,222,792 A *  9/1980 Lever et al. ................. 438/435
5,270,241 A * 12/1993 Dennison et al. ............ 438/396
5,643,472 A *  7/1997 Engelsberg et al. ........... 216/65

(Continued)

FOREIGN PATENT DOCUMENTS

JP    5-143972    6/1993

(Continued)

OTHER PUBLICATIONS

Aisaka et al (JP 2005-108407) Apr. 2005, machine translation.*

(Continued)

*Primary Examiner*—Kevin M. Bernatz
*Assistant Examiner*—Louis Falasco
(74) *Attorney, Agent, or Firm*—Oblon, Spivak, McClelland, Maier & Neustadt, L.L.P.

(57) ABSTRACT

In this invention, etching is not performed in the step of planarizing a polycrystalline Si wafer, but only mechanical grinding is performed for planarization. This is because, since the etching rate is crystal-face dependent, etching of the polycrystalline Si wafer unavoidably results in formation of steps due to different crystal face orientations of individual crystal grains exposed on a surface of the wafer, thus hindering precision surface planarization. Subsequently, the Si wafer surface is coated with an oxide film to form an Si wafer with oxide film prior to the final polishing stage and then a surface of the oxide film is planarized, to give a planar substrate (i.e., Si substrate with oxide film) having no step on the surface thereof.

17 Claims, 3 Drawing Sheets

U.S. PATENT DOCUMENTS

| | | | | |
|---|---|---|---|---|
| 5,781,376 | A * | 7/1998 | Tsukamoto | 360/235.1 |
| 6,063,300 | A * | 5/2000 | Suzuki et al. | 216/59 |
| 6,548,875 | B2 * | 4/2003 | Nishiyama | 257/377 |
| 6,849,885 | B2 * | 2/2005 | Enomoto et al. | 257/288 |
| 2001/0000586 | A1 * | 5/2001 | Li et al. | 156/345 |
| 2001/0041396 | A1 * | 11/2001 | Yamazaki et al. | 438/151 |
| 2003/0013280 | A1 * | 1/2003 | Yamanaka | 438/487 |
| 2004/0043628 | A1 * | 3/2004 | Yamazaki et al. | 438/774 |
| 2005/0196587 | A1 * | 9/2005 | Shinya et al. | 428/141 |
| 2005/0239240 | A1 * | 10/2005 | Ohtani et al. | 438/166 |
| 2006/0006495 | A1 * | 1/2006 | Herner et al. | 257/530 |
| 2008/0233330 | A1 * | 9/2008 | Ohashi | 428/64.4 |
| 2009/0017335 | A1 * | 1/2009 | Takai | 428/846.2 |
| 2009/0220821 | A1 * | 9/2009 | Ohashi | 428/826 |

FOREIGN PATENT DOCUMENTS

JP     2005-108407     4/2005

OTHER PUBLICATIONS

Okumura et al (JP 05-143972) Jun. 1993, machine translation.*

\* cited by examiner

Ra=0.169nm

μ-Wa=0.25nm

μ-Wa=4.5nm

METHOD OF FABRICATING SILICON SUBSTRATE FOR MAGNETIC RECORDING MEDIA, AND MAGNETIC RECORDING MEDIUM

BACKGROUND OF THE INVENTION

1. Field of the Invention

The present invention relates to a method of fabricating a silicon substrate for use in manufacturing magnetic recording media, and a magnetic recording medium including a magnetic recording layer on the silicon substrate obtained by the fabrication method.

2. Description of the Related Art

In the technical field of information recording, a hard disk device as means for magnetically reading/writing such information as letters, images, and music, is now indispensable as a primary external recording device or built-in type recording means for use with or in electronic devices including a personal computer. Such a hard disk device incorporates therein a hard disk as a magnetic recording medium. Conventional hard disks have employed a so-called "in-plane magnetic recording system (longitudinal magnetic recording system)" which is configured to write magnetic information on a disk surface longitudinally.

FIG. 1A is a schematic sectional view illustrating a typical stacked layer structure for a hard disk of the longitudinal magnetic recording system. This structure includes a Cr-based underlayer 2 formed by sputtering, a magnetic recording layer 3, and a carbon layer 4 as a protective layer, which are sequentially stacked on a non-magnetic substrate 1, and a liquid lubricating layer 5 formed by applying a liquid lubricant to the surface of the carbon layer 4 (see Japanese Patent Laid-Open No. 5-143972 (Patent Document 1) for example). The magnetic recording layer 3 comprises a uniaxial magnetocrystalline anisotropic Co alloy, such as CoCr, CoCrTa, or CoCrPt. Crystal grains of the Co alloy are magnetized in a longitudinal direction of a disk surface to record information. The arrows in the magnetic recording layer 3 shown indicate directions of magnetization.

With such a longitudinal magnetic recording system, however, when individual recording bits are reduced in size to increase the recording density, the north pole and south pole of a recording bit repel the north pole and south pole, respectively, of an adjacent recording bit, to make the boundary region magnetically unclear. For this reason, the thickness of the magnetic recording layer needs to be decreased to reduce the crystal grain size for the purpose of realizing recording density growth. It is pointed out that as crystal grains are made more minute (i.e., reduced in volume) and recording bits made smaller in size, a phenomenon called "heat fluctuation" occurs to disorder directions of magnetization of crystal grains by thermal energy, thereby to cause a loss of recorded data. Thus, the recording density growth has been considered to be limited. The effect of the heat fluctuation becomes serious when the $KuV/k_BT$ ratio is too low. Here, Ku represents magnetocrystalline anisotropic energy of a magnetic recording layer, V represents the volume of a recording bit, $k_B$ represents a Boltzmann constant, and T represents an absolute temperature (K).

In view of such a problem, a "perpendicular magnetic recording system" is now studied. With this recording system, the magnetic recording layer is magnetized perpendicularly to the disk surface, so that north poles and south poles are alternately arranged as bound one with the other in recording bits. Therefore, a north pole and a south pole in a magnetic domain are positioned adjacent to each other, to strengthen the mutual magnetization. As a result, the magnetized state (i.e., magnetic recording) is highly stabilized. When a magnetization direction is recorded perpendicularly, a demagnetizing field of a recording bit is lowered. For this reason, the perpendicular magnetic recording system does not need to make the recording layer very thin, as compared with the longitudinal magnetic recording system. Accordingly, if the recording layer is thickened to have a larger perpendicular dimension, the recording layer, as a whole, has an increased $KuV/k_BT$ ratio, thereby making it possible to reduce the effect of the "heat fluctuation".

Since the perpendicular magnetic recording system is capable of lowering the demagnetizing field and ensuring a satisfactory KuV value as described above, the perpendicular magnetic recording system can lower the instability of magnetization due to the "heat fluctuation", thereby making it possible to expand a margin of recording density substantially. Therefore, the perpendicular magnetic recording system is expected to realize ultrahigh density recording.

FIG. 1B is a schematic sectional view illustrating a basic layered structure for a hard disk as a "double-layered perpendicular magnetic recording medium" having a recording layer for perpendicular magnetic recording which is stacked on a soft magnetic backing layer. This structure includes a soft magnetic backing layer 12, a magnetic recording layer 13, a protective layer 14, and a lubricating layer 15, which are sequentially stacked on a non-magnetic substrate 11. Here, the soft magnetic backing layer 12 typically comprises permalloy, amorphous CoZrTa, or a like material. The magnetic recording layer 13 comprises a CoCrPt-based alloy, a CoPt-based alloy, a multi-layered film formed by alternately stacking several layers including a PtCo layer and ultrathin films of Pd and Co, or the like. The arrows in the magnetic recording layer 13 shown indicate directions of magnetization.

The hard disk of the perpendicular magnetic recording system includes the soft magnetic backing layer 12 underlying the magnetic recording layer 13, as shown in FIG. 1B. The soft magnetic backing layer 12, which has a magnetic property called "soft magnetic property", has a thickness of about 100 to about 200 nm. The soft magnetic backing layer 12 is provided for enhancing the writing magnetic field and lowering the demagnetizing field of the magnetic recording film and functions as a path which allows a magnetic flux to pass therethrough from the magnetic recording layer 13 while allowing a magnetic flux for writing to pass therethrough from a recording head. That is, the soft magnetic backing layer 12 functions like an iron yoke provided in a permanent-magnet magnetic circuit. For this reason, the soft magnetic backing layer 12 has to be set thicker than the magnetic recording layer 13 for the purpose of avoiding magnetic saturation during writing.

Magnetic recording media are gradually switching from the longitudinal magnetic recording system as shown in FIG. 1A to the perpendicular magnetic recording system as shown in FIG. 1B as the recording density increases from a border which ranges from 100 to 150 Gbit/square inch because the longitudinal magnetic recording system has a limited recording density due to the heat fluctuation. Though the recording limit of the perpendicular magnetic recording system remains uncertain at present, the recording limit is estimated to ensure a value of not less than 500 Gbit/square inch. In another view, the perpendicular magnetic recording system can achieve a recording density as high as about 1,000 Gbit/square inch. Such a high recording density can provide for a recording capacity of 600 to 700 Gbites per 2.5-in. HDD platter.

Substrates generally used in magnetic recording media for HDDs include an Al alloy substrate used as a substrate having a diameter of 3.5 inches, and a glass substrate used as a substrate having a diameter of 2.5 inches. In mobile applications such as a notebook personal computer, in particular, HDDs are likely to frequently undergo impacts from outside. Therefore, a 2.5-in. HDD used in such a mobile application has a high possibility that its recording medium or substrate is damaged or data destroyed by "head-disk collision". For this reason, use has been made of a glass substrate having a high hardness as a substrate for magnetic recording media.

As a mobile device is reduced in size, a substrate for use in a magnetic recording medium to be incorporated therein calls for a higher impact resistance. Substrates having small diameters of not more than 2 inches are mostly used in mobile applications and hence call for a higher impact resistance than 2.5-in. substrates. Also, the downsizing of such a mobile device inevitably calls for downsizing and thinning of parts to be used therein. The standard thickness of a substrate having a diameter of 2.5 inches is 0.635 mm, whereas that of a substrate having a diameter of, for example, 1 inch is 0.382 mm. Under such background circumstances, a demand exists for a substrate which has a high Young's modulus, ensures a sufficient strength even when made thin, and offers good compatibility with the magnetic recording medium fabrication process.

Though a glass substrate having a diameter of 1 inch and a thickness of 0.382 mm has been put to practical use by mainly using reinforced amorphous glass, further thinning is not easy. Further, since a glass substrate is an insulator, a problem arises that the substrate is likely to be charged up during a sputtering process for formation of a magnetic film. Though volume production is made practically possible by changing a holder holding a substrate to another one during sputtering, this problem is one of the factors making the use of a glass substrate difficult.

Study has been made of FePt having high magnetocrystalline anisotropy or the like as a material for a next-generation recording film. Such an FePt film needs to be heat-treated at a high temperature of about 600° C. so as to have a higher coercive force. Though studies have been made to lower the heat treatment temperature, a heat treatment at a temperature of not lower than 400° C. is still needed. Such a temperature exceeds the temperature at which currently used glass substrates can resist. Likewise, Al substrates cannot resist such a high temperature treatment.

Also, study has been made of discrete track media (DTM) and bit patterned media (BPM) aiming at improving the recording density by microfabrication of magnetic recording media. Such microfabrication includes techniques of the semiconductor field, such as an etching technique. Under the actual circumstances, it is difficult to subject the surface of a currently available glass substrate or Al substrate directly to such microfabrication.

Besides such glass substrate and Al substrate, alternative substrates have been proposed which include a sapphire glass substrate, an SiC substrate, an engineering plastic substrate, and a carbon substrate. However, the realities are such that any one of such substrates is inadequate for use as an alternative substrate for next-generation recording media in view of its strength, processability, cost, surface smoothness, affinity for film formation, compatibility with microfabrication, heat resistance, and like properties.

Under such background circumstances, the inventors of the present invention have already proposed use of a single crystal silicon (Si) substrate as an HDD recording film substrate (see Japanese Patent Laid-Open No. 2005-108407 (Patent Document 2) for example).

Such a single crystal Si substrate, which is widely used as a substrate for LSI fabrication, is excellent in surface smoothness, environmental stability, reliability, and the like and has a higher rigidity than glass substrates. For this reason, the single crystal Si substrate is suitable for an HDD substrate. In addition, unlike glass substrates having insulating properties, the single crystal Si substrate is semiconductive and has a certain electric conductivity because the single crystal Si substrate usually contains a p- or n-type dopant. Thus, the single crystal Si substrate can lessen the charge-up effect which occurs during film formation by sputtering to a certain extent and allows a metal film to be formed thereon by direct sputtering or bias sputtering. Further, since the single crystal Si substrate has good thermal conductivity and is resistant to high temperatures, the Si crystal substrate can easily undergo heating at 400° C. or higher and hence has very good compatibility with a sputtering process for formation of FePt film or the like which calls for heating at elevated temperatures.

What is more, the Si substrate has the advantage that its crystal purity is very high and its substrate surface obtained after processing is stable with a negligible change with time. Further, the silicon substrate, which is highly compatible with the semiconductor fabrication process, is applicable to next-generation recording media.

However, Si single crystals of the "semiconductor grade" for fabrication of such devices as LSIs are generally expensive. Further, the prices of single crystal silicon and polycrystalline silicon of the "solar grade" are soaring with increasing demand due to solar cells widespread in recent years. When consideration is given to use of a single crystal Si substrate as a substrate for magnetic recording media, a serious problem arises that the single crystal Si substrate is significantly inferior to glass substrates or Al substrates in terms of raw material cost.

The single crystal Si substrate has the property of cleaving in a specific crystal orientation (110). For this reason, when the single crystal Si substrate used in a mobile device or the like undergoes an external impact, the substrate might cleave. In this respect, the inventors of the present invention have confirmed that no practical problem will arise if end face polishing is improved. However, some probability of fracture remains.

SUMMARY OF THE INVENTION

The present invention has been made in view of the foregoing problems. Accordingly, it is an object of the present invention to provide an Si substrate for magnetic recording media which has sufficient impact resistance and heat resistance, fails to complicate the fabrication process and the magnetic recording layer forming process, exhibits an excellent surface planarity, and allows the cost to be reduced, as well as a method of fabricating the same.

In order to solve the foregoing problems, a method of fabricating a polycrystalline silicon substrate for magnetic recording media according to the present invention comprises: a grinding step of mechanically grinding a surface of a polycrystalline silicon wafer cored from a polycrystalline silicon ingot; an oxidation step of forming an oxide film over the surface of the polycrystalline silicon wafer thus mechanically ground; and a polishing step of polishing the oxide film to planarize and smooth a surface of the oxide film.

Preferably, the oxide film having been subjected to the polishing step has a thickness of not more than 1,000 nm and not less than 10 nm.

Preferably, the mechanical grinding in the grinding step is performed such that a work affected layer has a thickness of not more than 1,000 nm.

In the present invention, etching is not performed to eliminate the work affected layer during the step of planarizing the polycrystalline Si wafer. This is because, since the etching rate is crystal-face dependent, etching of the polycrystalline Si wafer unavoidably results in formation of steps due to different crystal face orientations of individual crystal grains exposed on the wafer surface, thus hindering precision surface planarization. In the present invention, a surface of the Si wafer is coated with an oxide film to form an Si wafer with oxide film prior to the final polishing stage and then a surface of the oxide film is planarized, to give a planar substrate (i.e., Si substrate with oxide film) having no step on the surface thereof.

Thus, it is possible to provide an Si substrate for magnetic recording media which has a sufficient impact resistance, fails to complicate the fabrication process and the magnetic recording layer forming process, exhibits an excellent surface planarity, and allows the cost to be reduced.

DETAILED DESCRIPTION OF THE PREFERRED EMBODIMENTS

Hereinafter, embodiments of the present invention will be described with reference to the drawings.

Figure 2:
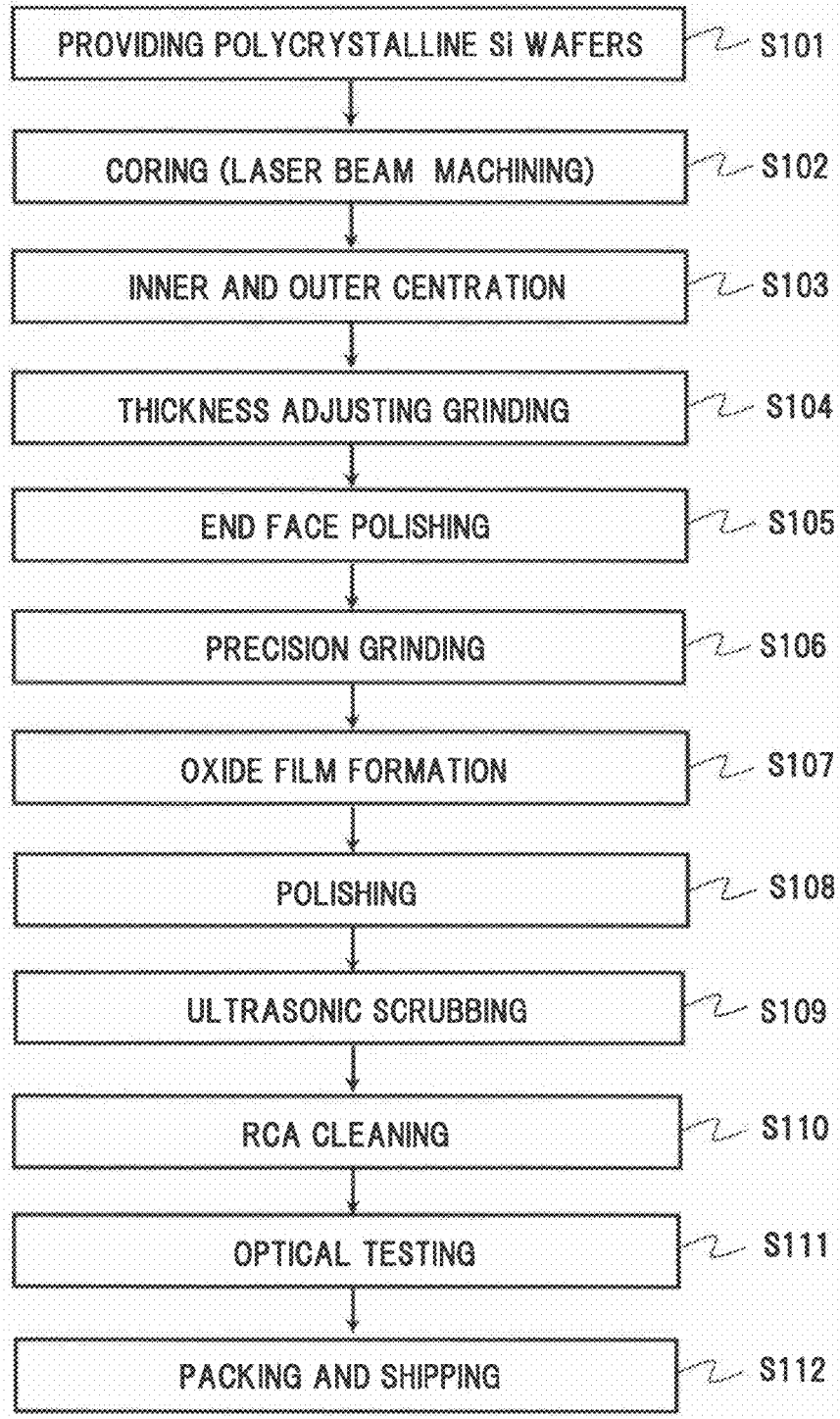
FIG. 2 is a flowchart illustrating an exemplary process for fabricating an Si substrate for magnetic recording media according to the present invention.

FIG. 2 is a flowchart illustrating an exemplary process for fabricating an Si substrate for magnetic recording media according to the present invention. As already described, in the present invention the so-called "etching" is not performed in the step of planarizing a polycrystalline Si wafer, but only mechanical grinding is performed to planarize a surface of the wafer. This is because, since the etching rate is crystal-face dependent, etching of the polycrystalline Si wafer unavoidably results in formation of steps due to different crystal face orientations of individual crystal grains exposed on the wafer surface, thus hindering precision surface planarization.

Usually, the final polishing stage employs a CMP process using colloidal silica slurry. The etching effect of the CMP process causes steps to be formed on the Si wafer surface. To obviate this problem, the present invention includes coating the Si wafer surface with an oxide film to form an Si wafer with oxide film prior to the final polishing stage and then planarizing a surface of the oxide film, to give a planar substrate (i.e., Si substrate with oxide film) having no step on the surface thereof. This oxidation step also serves to relax a thin work affected layer resulting from the preceding mechanical grinding by annealing while making the thin affected layer completely disappear by turning the affected layer into an amorphous silicon oxide layer by oxidation.

Description will be made of the procedure for obtaining the Si substrate with oxide film having a planar surface according to the flowchart of FIG. 2.

First, a polycrystalline Si wafer is provided from which an Si substrate is obtained by coring (step S101). Such a polycrystalline Si wafer need not necessarily have the so-called "semiconductor grade" (which generally has a purity of "11 nines" (99.999999999%) or higher). It is sufficient for the polycrystalline Si wafer to have a purity of substantially the "solar grade" or lower. Though the purity of a polycrystalline Si wafer having the solar grade is generally not less than "6 nines" (99.9999%), the present invention can tolerate a purity down to "4 nines" (99.99%). Because a substrate for magnetic recording media is basically used as a structural material, there is no need to control the amount of a dopant, such as boron (B) or phosphorus (P), unlike in an application to solar cells.

The lower limit of the purity of the polycrystalline Si wafer is set to "4 nines" (99.99%) because a lower purity than the lower limit might allow an impurity contained in the crystal to precipitate in grain boundaries or in grains, thereby lowering the strength of the substrate or the surface smoothness of the substrate. Though a polycrystalline Si wafer having a higher purity is more preferable from the viewpoint of the substrate strength, substrate smoothness, and the like, the raw material cost increases as the purity becomes higher. For this reason, the purity of the polycrystalline Si wafer is usually about "8 nines" (99.999999%) to about "9 nines" (99.9999999%) at the highest.

The polycrystalline Si wafer may be shaped rectangular or like a disc. From the viewpoint of improvement in the strength and impact resistance of the polycrystalline Si wafer itself, the average grain size of polycrystalline grains is desirably not less than 50 μm (preferably not less than 1 mm) and not more than 15 mm.

The polycrystalline Si substrate is obtained from such a polycrystalline Si wafer by "coring" by laser beam machining (step S102). In the present invention, the polycrystalline Si substrate is expected to be used mainly as an Si substrate for magnetic recording media for use in mobile devices. For this reason, the diameter of the Si substrate thus cored is not more than about 65 mm, and the lower limit of the diameter of the Si substrate is generally 21 mm.

The coring can be achieved by various methods including cutting using a straight cup diamond wheel, ultrasonic cutting, blasting, and water jet machining. Laser coring using a solid state laser is desirable because the laser coring has advantages including: a certain cutting speed ensured, the width of cut reduced, easy change of diameter, and ease of jig making and post-processing. Since such a solid state laser has a high power density and can reduce the beam diameter, a cut surface obtained by the solid state laser is relatively clear with less dross. Laser light sources for use in such a case include an Nd-YAG laser, a Yb-YAG laser, and the like.

The Si substrate thus obtained by coring is subjected to centration (step S103), thickness adjusting grinding (step S104), end face polishing (step S105), and then precision grinding (step S106). Though the end face polishing (step S105) of the wafer is performed after the thickness adjusting grinding (step S104) according to the example shown in FIG. 2, this order may be reversed.

The thickness adjusting grinding (step S104) and the precision grinding (step S106) are performed instead of lapping, etching and first-stage polishing which are employed in a common Si substrate fabrication process, for the purpose of obviating formation of steps on the Si wafer surface caused by etching. These mechanical grinding steps, which are included within the scope of ductile work for Si crystal, are performed so that a resulting work affected layer has a thickness of not more than about 1,000 nm (preferably not less than 10 nm).

The thickness adjusting grinding (step S104) is performed to limit in-plane thickness irregularities of the Si wafer or surface roughness resulting from cutting to within a predetermined range and serves as a substitute for common lapping. The precision grinding (step S106) uses a higher-number grinding wheel (for example a diamond wheel of number 4,000 or higher) than the thickness adjusting grinding (step S104) to eliminate the work affected layer on the wafer surface, adjust the wafer thickness, and reduce the surface waviness. Use of fine grain diamond wheels in the thickness adjusting grinding (step S104) and the precision grinding (step S106) makes it possible to limit the depth of a grinding mark to 100 nm or less.

As described above, the main reason why the thickness adjusting grinding (step S104) and the precision grinding (step S106) are employed instead of the common lapping, etching, and first-stage polishing, is to prevent formation of steps between crystal grains on the polycrystalline Si wafer surface. Generally, when etching for eliminating strain is performed after a polycrystalline Si wafer has been lapped, the etching rate differs due to different crystal face orientations of individual crystal grains, which results in formation of steps measuring several micrometers or more between crystal grains. A lengthy process is required to eliminate such steps by polishing. The present invention does not need such a lengthy process.

The combination of the thickness adjusting grinding (step S104) and the precision grinding (step S106) is capable of limiting crystal deterioration (affected layer) in a surface region of the wafer caused by grinding to a low degree (about 1,000 nm or less) and hence has another advantage that the oxide film formation (step S107) is possible even when the work affected layer is not eliminated particularly.

In such mechanical grinding, selection of a grinding wheel and a grinder is essential. The grinding wheel (thickness adjusting wheel) to be used in the thickness adjusting grinding (step S104) is desirably a fixed diamond wheel comprising fine grains of diamond, the grain size of which is not less than number 300. A grain size of less than number 300 is not preferable because the resulting work affected layer becomes thicker and the resulting grinding mark becomes deeper, though the grinding rate is higher. In the precision grinding (step S106), use of far higher-number abrasive grains of diamond (for example not less than number 4,000) is preferable. There are various methods of fixing fine grains of diamond, including, for example, a method using vitrified bond which offers sharpness sustainability and rigidity both. Resin bond, metal bond, electrodeposited grinding wheel, and the like can also be used.

The grinder needs to have a high rigidity in order to reduce thickness irregularities and waviness of the wafer. Grinders include a surface grinder, a rotary grinder, and the like. The rotary grinder is desirable in reducing the thickness irregularities and the waviness.

After such mechanical grinding, the surface of the polycrystalline Si wafer is oxidized to form an oxide film (step S107). There are various methods of forming such an oxide film. A thermal oxidation method is preferable in view of its efficiency and reliability. For example, oxidation by introduction of water vapor at elevated temperatures of not lower than 1,000° C., preferably at temperatures from 1,000° C. to 1,300° C. (water bubbling, pyrogenic oxidation using ($H_2$+ $O_2$) gas, or the like) is efficient. Needless to say, thermal oxidation in the atmosphere (at 1,000° C. to 1,300° C.) and high pressure oxidation are possible.

Other methods include a method of obtaining an $SiO_2$ film by coating a wafer surface with organosilica (organic silica) or a silicone material, followed by heat treatment. When using organosilica or the silicone material, a liquid material containing the silicone material or organosilica is applied to the Si wafer surface to form a smooth thin film, which is then subjected to a heat treatment at an appropriate temperature to allow organic components thereof to evaporate off, thus giving the $SiO_2$ film.

Examples of silicon sources for such oxide film formation include a hydrolytic condensate (for example, AQUFLOW T-27 produced by Honeywell, AQUGLASS P-5S produced by ALLIED SIGNAL, or the like) prepared by hydrolyzing and condensing a silane compound (particularly alkoxysilane).

The provision of the oxide film on the surface of the polycrystalline Si wafer offers the advantages that: the presence of the oxide film enhances the strength of the wafer; the oxide film (i.e., $SiO_2$ film), which is amorphous, fails to cleave in a specific orientation; and the polish rate in the plane of the wafer is invariant in the subsequent polishing step, which makes it easy to ensure desired planarity and smoothness, and other advantages. A further advantage is that the thermal oxidation process or the heat treatment of organosilica can convert the thin work affected layer produced by the precision grinding to a thermal oxide film, thus making recovery from damage.

The polycrystalline Si wafer thus obtained is subjected to polishing (step S108). The polishing (step S108) is performed in substantially two stages including a surface planarization stage (rough polishing) and a surface smoothing stage (precision polishing). Here, since the polishing is performed on the oxide film surface, rough polishing slurry used therein comprises ceria or colloidal silica for example. In the precision polishing for ensuring a desired surface smoothness, a CMP process using slurry of colloidal silica (having an average particle diameter of 20 to 80 nm) is performed for about five minutes to about an hour.

Preferably, the rough polishing and the precision polishing are performed at a polishing pressure of 5 to 50 kg/cm² and a polishing pressure of 1 to 30 kg/cm², respectively.

As described above, the presence of the amorphous oxide film on the surface of the polycrystalline Si wafer can eliminate the problem of formation of steps caused by the polish rate differing grain by grain. For this reason, the pH value of the polishing slurry may be on the acidic side or on the alkaline side as long as a satisfactory polished surface is ensured. However, the pH value preferably ranges from a value close to neutral to a value in the alkaline region (i.e., pH 7 to 10).

The polishing step (step S108) removes a portion of the oxide film that has an appropriate thickness, to make the remaining oxide film usually have a thickness of about 10 to about 1,000 nm (for example 10 to 700 nm). When the oxide film thickness is less than 10 nm, it is difficult for the oxide film to have a uniform thickness distribution. When the oxide film thickness is more than 1,000 nm, an increased oxide film thickness is needed before polishing, which is disadvantageous in terms of cost.

In the present invention described above, the precision grinding is introduced into the polycrystalline Si wafer fabrication process in order to eliminate the etching step and then the oxide film is formed over the wafer surface in an appropriate stage. For this reason, a planar and smooth surface can be obtained by the CMP process with no effect reflecting differences in crystal face orientation among polycrystalline grains or the presence of crystal grain boundaries. Also, the lapping work and the etching step can be eliminated, which makes it easy to eliminate steps on the wafer surface and smooth the wafer surface.

Subsequent to the polishing step (step S108), the wafer surface is cleaned by ultrasonic scrubbing (step S109), RCA cleaning (step S110), and the like. Only the ultrasonic scrubbing (step S109) may be performed if the cleaning is appropriate. Thereafter, the substrate surface is subjected to optical testing (step S111), and then the polycrystalline Si substrate is packed and shipped (step S112).

Figure 1A:
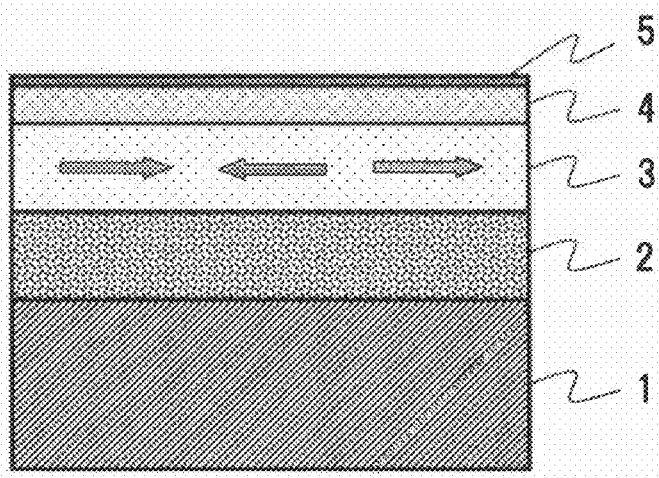
FIG. 1A is a schematic sectional view illustrating a typical stacked layer structure for a hard disk of the longitudinal magnetic recording system.
Figure 1B:
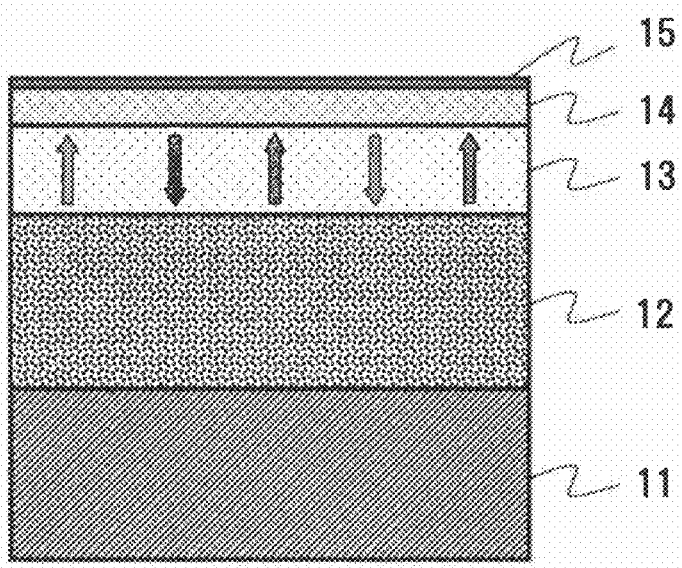
FIG. 1B is a schematic sectional view illustrating a basic layered structure for a hard disk as a "double-layered perpendicular magnetic recording medium" having a recording layer for perpendicular magnetic recording which is stacked on a soft magnetic backing layer.

By providing a magnetic film comprising FePt or the like on the thus obtained polycrystalline Si substrate (wafer), there is formed a perpendicular magnetic recording medium as shown in FIG. 1B, a thermally assisted magnetic recording medium, or a bit patterned medium.

Hereinafter, the present invention will be described more specifically by way of examples, which in no way limit the present invention.

EXAMPLES

Polycrystalline Si wafers having a purity of "4 nines" (156 mm square and 0.6 mm thick) were provided (step S101). Four substrates were obtained per wafer by coring Si substrates each having an outer diameter of 65 mm and an inner diameter of 20 mm from each of the polycrystalline Si wafers with use of a laser beam machine (YAG laser, wavelength: 1,064 nm) (step S102). These substrates were subjected to centration (step S103), thickness adjusting grinding (step S104), end face polishing (step S105), and precision grinding (step S106). A resin bond diamond wheel of No. 1,000 was used in the thickness adjusting grinding (step S104), while a vitrified diamond wheel of No. 8,000 was used in the precision grinding (step S106).

Further, the polycrystalline Si wafer is subjected to rough cleaning using a scrubber to remove dust and particles deposited thereon. Thereafter, the wafer was allowed to stand for 10 hours in an environment supplied with water vapor by bubbling at 1,050° C., to form an oxide film having a thickness of about 1,500 nm (step S107). The thickness of the oxide film was measured by measuring thickness values at four points on a circumference having a radius of 32 mm on each substrate having a diameter Φ of 65 mm by means of an optical interference measurement device and averaging the measured thickness values.

Subsequently, the major surface of the polycrystalline Si wafer was subjected to polishing (step S108). First, in the rough polishing stage, polishing was performed at a polishing pressure of 20 kg/cm$^2$ for 5 to 10 minutes using a double-side polishing machine with a slurry of average ceria having a pH value of 9 (particle diameter: 30 nm), to abrade the oxide film by a thickness of about 300 to about 1,000 nm from the oxide film surface. According to measurement of steps defined between grains on the roughly polished major surface of the polycrystalline Si wafer by an optical testing instrument (New View 6100 manufactured by Zygo Co.), no distinct step was recognized on a sample having the oxide film polished by a thickness of not less than 500 nm (see Table 1).

In the subsequent precision polishing stage, the CMP process was performed at a polishing pressure of 8 kg/cm$^2$ using fine particle colloidal silica (pH value: 10, particle diameter: 40 nm), to abrade the oxide film by a thickness of 100 to 400 nm from the oxide film surface. Thus, a smooth surface was obtained.

These polycrystalline Si wafers were subjected to scrubbing (step S109) to remove residual colloidal silica and then subjected to precision cleaning (i.e., RCA cleaning: step S110). The surface characteristics of each of the polycrystalline Si wafers thus cleaned were evaluated by optical testing (step S111). Specifically, the waviness (microwaviness) and smoothness (i.e., roughness) of the polished surface of each wafer were evaluated. (The microwaviness was measured using an optical measuring instrument manufactured by Zygo Co., while the roughness was measured by an AFM apparatus manufactured by Digital Instrument Co.)

Table 1 collectively shows the results of evaluation of the samples according to examples 1 to 7 thus obtained (Ra: roughness, μ-Wa: microwaviness). Table 1 also shows the result of evaluation of a sample uncoated with oxide film (no coat) as a comparative example.

As can be seen from the results shown in Table 1, the polycrystalline Si wafers with oxide film, which were obtained by polishing to abrade an appropriate amount of oxide film, had good surface characteristics and hence were in good surface conditions suitable as substrates for magnetic recording media.

TABLE 1

| | Oxide film thickness and processing conditions | | | |
|---|---|---|---|---|
| | Remaining oxide film thickness (nm) | Abrasion wear (nm) Rough/Precision | Ra (nm) | μ-Wa (nm) |
| Comparative Example A | 1250 | 300/0 | 0.80 | 2.40 |
| Example 1 | 980 | 500/0 | 0.45 | 1.80 |
| Example 2 | 690 | 800/0 | 0.35 | 0.95 |
| Example 3 | 480 | 1000/0 | 0.32 | 0.35 |
| Example 4 | 550 | 900/100 | 0.31 | 0.35 |
| Example 5 | 460 | 900/200 | 0.29 | 0.30 |
| Example 6 | 320 | 900/300 | 0.25 | 0.27 |
| Example 7 | 150 | 800/500 | 0.17 | 0.25 |
| Comparative Example B | 0 | 900/300 | 0.15 | 4.5 |

Figure 3A:
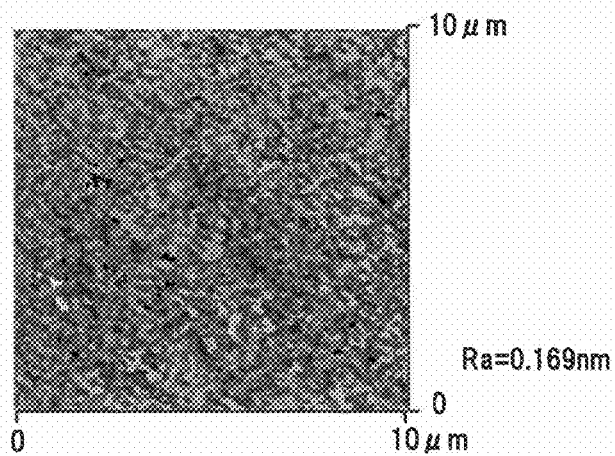
FIG. 3A illustrates the result of evaluation of surface roughness of a sample according to example 7.
Figure 3B:
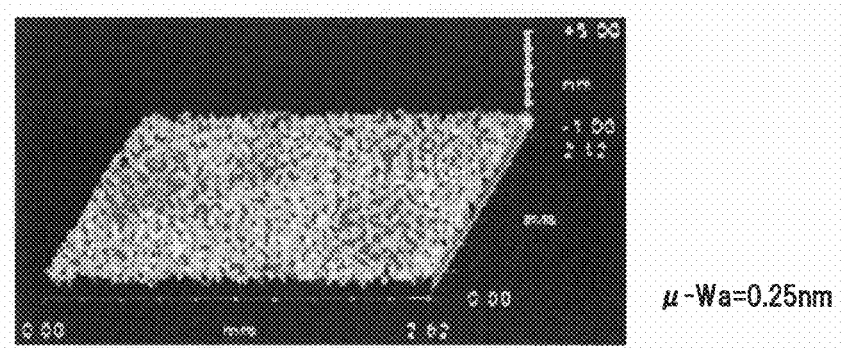
FIG. 3B illustrates the result of evaluation of waviness of the same sample.
Figure 3C:
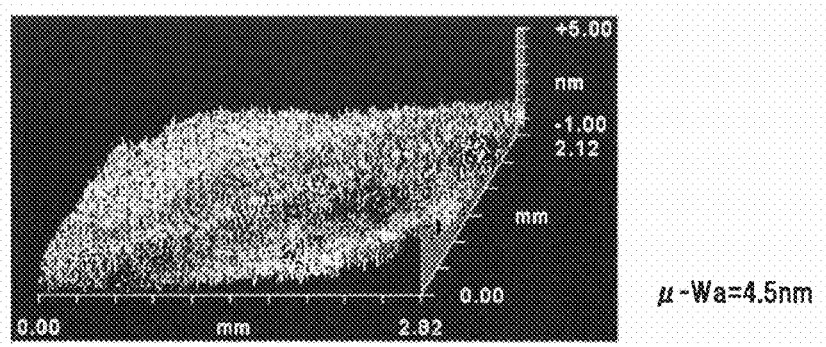
FIG. 3C illustrates the result of evaluation of waviness of a sample according to comparative example B.

FIGS. 3A-C illustrates the results of evaluation of the surface of a sample according to example 7; specifically, FIG. 3A illustrates the result of evaluation of surface roughness and FIG. 3B illustrates the result of evaluation of μ-waviness. For comparison, FIG. 3C illustrates the result of evaluation of μ-waviness of a sample according to comparative example B.

On the silicon substrate according to example 7, a 100 nm-thick CoZrNb film, a 10 nm-thick Ru film and a 20 nm-thick FePt film were sequentially formed by sputtering. The resulting structure was further provided with a 4 nm-thick diamond-like carbon (DLC) film formed by CVD and a lubricating film applied by spin coating, to form a magnetic recording medium. The magnetic recording medium thus obtained exhibited satisfactory magnetic characteristics including good surface characteristics, an Hc value of about 10 kOe, and good rectangularity.

The present invention makes it possible to provide a polycrystalline Si substrate for magnetic recording media which has a sufficient impact resistance, fails to complicate the fabrication process and the magnetic recording layer forming process, exhibits an excellent surface planarity, and allows the cost to be reduced, as well as a magnetic recording medium using such a substrate.

What is claimed is:

1. A magnetic recording medium comprising a polycrystalline silicon substrate having a micro-waviness of from 0.25-1.8 nm and a magnetic recording layer formed thereon wherein the polycrystalline silicon substrate is obtained by a method of fabricating, comprising:
mechanically grinding a surface of a polycrystalline silicon wafer cored from a polycrystalline silicon ingot to form a mechanically ground polycrystalline silicon wafer;
forming an oxide film directly over the mechanically ground surface of the polycrystalline silicon wafer and polishing the oxide film to planarize and smooth a surface of the oxide film to a thickness ranging from 150 to 980 nm thereby forming the polycrystalline silicon substrate;
wherein the method prior to forming an oxide film does not comprise etching.

2. The magnetic recording medium of claim 1, wherein the polished oxide film has a thickness of not more than 1,000 nm and not less than 10 nm.

3. The magnetic recording medium of claim 1, wherein the mechanical grinding is performed such that a work affected layer has a thickness of not more than 1,000 nm.

4. The magnetic recording medium of claim 1, wherein in the method the polycrystalline silicon wafer has a purity of 99.999999999%.

5. The magnetic recording medium of claim 1, wherein in the method the polycrystalline silicon wafer has a purity of 99.9999%.

6. The method of claim 1, wherein in the method the polycrystalline silicon wafer has a purity of 99.99%.

7. The magnetic recording medium of claim 1, wherein in the method the polycrystalline silicon wafer is disc shaped or rectangular shaped.

8. The magnetic recording medium of claim 1, wherein in the method the polycrystalline silicon wafer has a diameter ranging from 21 mm to 65 mm.

9. The magnetic recording medium of claim 1, wherein in the method, the polycrystalline silicon wafer has an average grain size ranging from 50 µm to 15 mm.

10. The magnetic recording medium of claim 1, wherein the mechanical grinding comprises mechanically grinding with a diamond wheel.

11. The magnetic recording medium of claim 10, wherein the diamond wheel has a number of 4,000 or higher.

12. The magnetic recording medium of claim 1, wherein the forming an oxide film comprises thermally oxidizing the surface of the ground silicon wafer by contact with water vapor at a temperature ranging from 1,000° C. to 1,300° C.

13. The magnetic recording medium of claim 6, wherein in the method, the polycrystalline silicon substrate has a diameter ranging from 21 mm to 65 mm.

14. The magnetic recording medium of claim 13, wherein the mechanical grinding comprises mechanically grinding with a diamond wheel.

15. The magnetic recording medium of claim 14, wherein the forming an oxide film comprises thermally oxidizing the surface of the ground silicon wafer by contact with water vapor at a temperature ranging from 1,000° C. to 1,300° C.

16. The magnetic recording medium of claim 2, wherein in the method, the polished oxide film has a thickness ranging from 150 to 980 nm.

17. The magnetic recording medium of claim 1, wherein the polished oxide film has a thickness ranging from 10 nm to 1000 nm.

* * * * *